United States Patent
Goldman et al.

(10) Patent No.: US 6,180,885 B1
(45) Date of Patent: *Jan. 30, 2001

(54) WEATHERPROOFING BUSWAY SYSTEMS

(75) Inventors: Ira Goldman, Waterbury, CT (US); Clarence W. Walker, Selmer, TN (US); Walter Thomas McCabe, Jr., Iuka, MS (US); Joseph F. Hutcheson, Temple, GA (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/785,450

(22) Filed: Jan. 17, 1997

(51) Int. Cl.$^7$ .............................. H02G 5/00; B05C 13/00

(52) U.S. Cl. .................... 174/68.2; 174/72 B; 174/88 B; 174/99 B; 427/142; 427/387

(58) Field of Search ..................................... 427/140, 142, 427/387; 174/88 B, 72 B, 99 B, 68.2; 439/210–213

(56) References Cited

U.S. PATENT DOCUMENTS

| | | | |
|---|---|---|---|
| 4,979,906 | 12/1990 | Shrout et al. | 439/213 |
| 5,007,765 | * 4/1991 | Dietlein et al. | 404/74 |
| 5,196,455 | * 3/1993 | Bryant | 521/51 |
| 5,401,906 | 3/1995 | Bryant | 174/88 |
| 5,442,135 | * 8/1995 | Faulkner et al. | 174/68.2 |
| 5,486,651 | 1/1996 | Morgan | 174/68.2 |

OTHER PUBLICATIONS

Nowicki, "Reactive Hot Melt Polyurethane Adhesives", National Starch and Chemical Company, Sep. 10, 1991.*

* cited by examiner

*Primary Examiner*—Brian K. Talbot
(74) *Attorney, Agent, or Firm*—Cantor Colburn LLP; Carl B. Horton

(57) ABSTRACT

A method for sealing joints, gaps, and surfaces in an electrical busway distribution system comprises selecting a self-leveling sealant, applying the self-leveling sealant directly to joints, gaps, or surfaces of the busway system, and allowing the sealant to cure to form continuous seal between the joints, gaps, and surfaces. After applying the sealant, it subsequently flows into the joints, gaps, and across the surfaces solely under gravitational influence so that the joints, gaps and other surfaces are sufficiently filled by the sealant.

11 Claims, 5 Drawing Sheets

WEATHERPROOFING BUSWAY SYSTEMS

FIELD OF THE INVENTION

This invention concerns a method and material for weatherproofing electrical busway distribution systems, and more specifically, an improved method and material for sealing joints and gaps in electrical busway distribution systems.

BACKGROUND OF THE INVENTION

Electrical busway distribution systems, or busway systems, that are designed for outdoor use need to be weatherproofed or protected from the elements such as moisture, rain, or snow. Busway systems that are employed indoors also have to be protected to a certain extent from water penetration from various sources such as dripping water or sprayed water. The ingress and diffusion of water and/or moisture into a busway system can cause shorting among the various separate phased bus conductors, leading to potentially catastrophic problems such as fires.

The traditional method of sealing joints or gaps in busway housing assemblies or covers has been the use of gaskets or sealing strips to weatherproof the busway systems. U.S. Pat. No. 4,979,906 entitled "Busway Weatherproof Housing" protects outdoor busway systems from exposure with an improved weatherproofed housing for the busway joints. The housing includes end pieces which are attached to and sealed to the busway enclosure that houses and protects the electrical conductors, and joint covers enclosing the joint area between the end pieces. Sealing the inside surface of the joint cover and the outside surface of the joint end piece is accomplished by compressing a rubber material between the two surfaces.

U.S. Pat. No. 5,401,906 entitled "Water Resistant Supplementary Joint Cover for an Electrical Busway" describes the use of gaskets and sealing strips to waterproof busway systems. In this patent, a joint cover system is disclosed. The busway system comes with supplementary water dams and joint covers to protect the busway joint area from the ingress of occasional dripping or sprayed water from within a building. The dam assembly comprises sealing plates and sealing strips made out of a tacky, deformable nonelastic material such as rubber. The joint cover system further includes connecting channels with water resistant gaskets attached. The gaskets seal the busway housing sides and the cover plates against the ingress of water.

Besides the above approaches which require prefabricated and customized sealing strips or gaskets sized to fit between or around joints and cover parts, there exists another method to close the joints, gaps, or surfaces in busway housing assemblies without the need for multi-pieces of gaskets and sealing strips. This method employs polysulfide as a sealant to seal the joints and gaps in busway systems. There are various disadvantages associated with this method. The use of polysulfide as a sealant is a cumbersome method, requiring the application of a surface adhesion-promoter or a primer to the joint surfaces first to cause the polysulfide to form an intimate contact and maximum bond with the joint surfaces. Additionally, polysulfide is a two-component system requiring a cumbersome and complex mixing process along with a complex mixing ratio prior to application. The mixing process is more often than not a trial-and-error run to obtain the optimum mixing ratio in order to give a sealant that is strong and adhesive. If the mixing ratio is not exact to give an optimum result, the sealant has to be scraped off the busway and the entire batch of sealant material is scrapped. This polysulfide sealing process typically results in a material waste of up to fifty percent (50%) or more.

Polysulfide sealant takes a long time to "fully" cure as applied on busway systems. The drying time is about twenty minutes to touch, forty minutes or so to set, and about seven days for a final cure. In addition, the material often cures in the delivery system and plugs up the line and the application gun. This means the delivery system has to be shut down for purges, resulting in frequent downtime and material loss due to the clean-up. Furthermore, polysulfide is a health and environment problem with the polysulfide material having an obnoxious odor and a high hazard rating due to the required presence of a lead dioxide curing agent.

OBJECTS OF THE INVENTION

The need to build a tight, well-sealed busway system is well-recognized in the art. It is therefore an object of the present invention to provide a new and improved method allowing a water-tight seal to be formed in the joint areas of a busway system, weatherproofing the busway system and preventing water from entering the busway system causing catastrophic failures.

It is another object of the present invention to provide a new and improved composition for weatherproofing busway systems which can be applied to such busway systems safely and easily.

Further, another object of the present invention is the elimination of seals and gaskets to close joints and gaps in busway housing assemblies.

Still yet a further object of the present invention is to provide a new and improved method for weatherproofing busway systems in a low-cost and efficient manner.

SUMMARY OF THE INVENTION

The method of the present invention comprises the steps of applying a sealant material between joints and gaps of busway systems and allowing the sealant to cure, forming a strong and continuous seal between the joint surfaces. The sealant material is a self-leveling, flowable material that forms a moisture-proof bond to the joint surfaces.

DESCRIPTION OF THE PREFERRED EMBODIMENT

Figure 1:
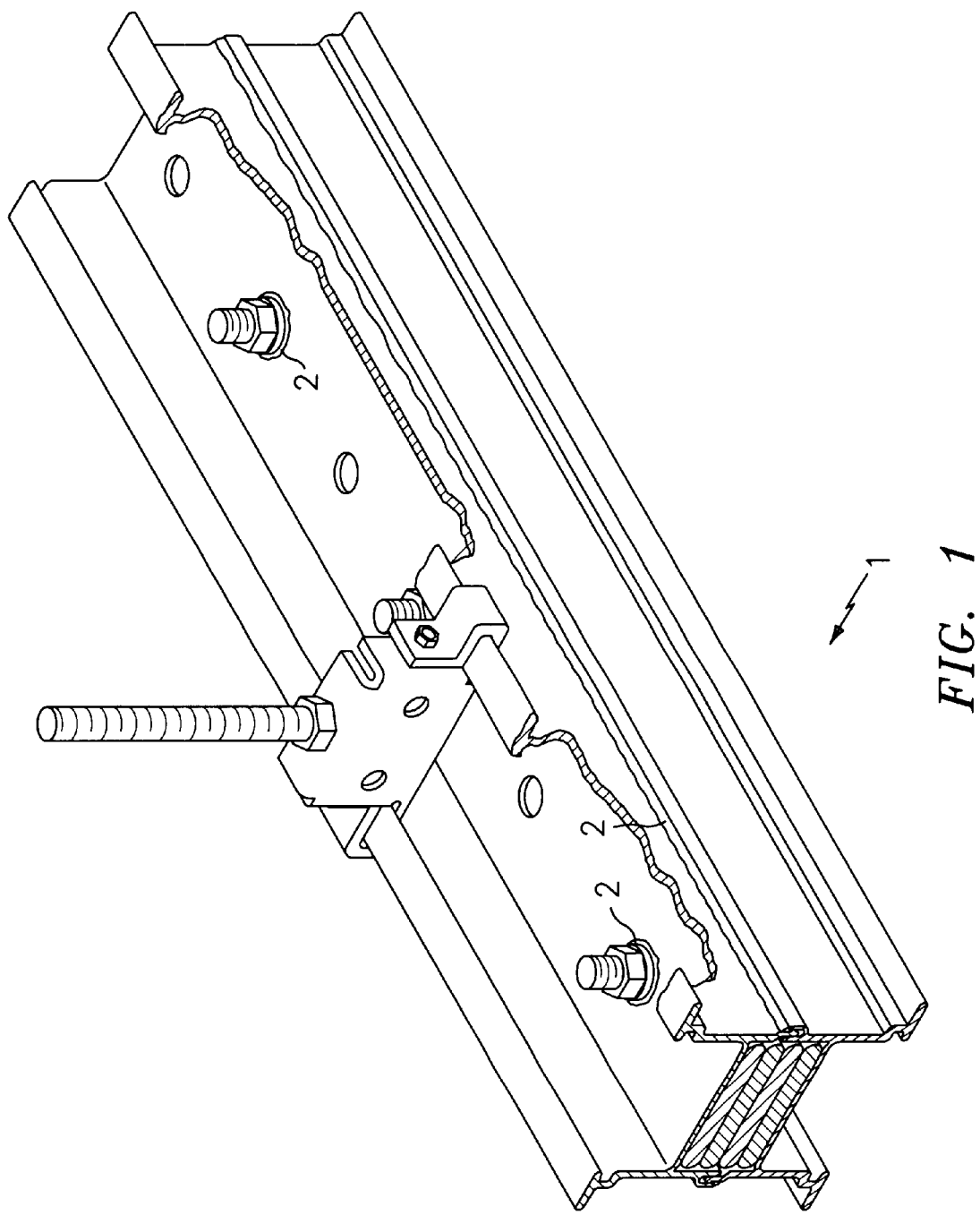
FIG. 1 is a top perspective view of a section of busway system with axial joints in the housing assemblies that can be weatherproofed by the method and material of this invention.
Figure 2:
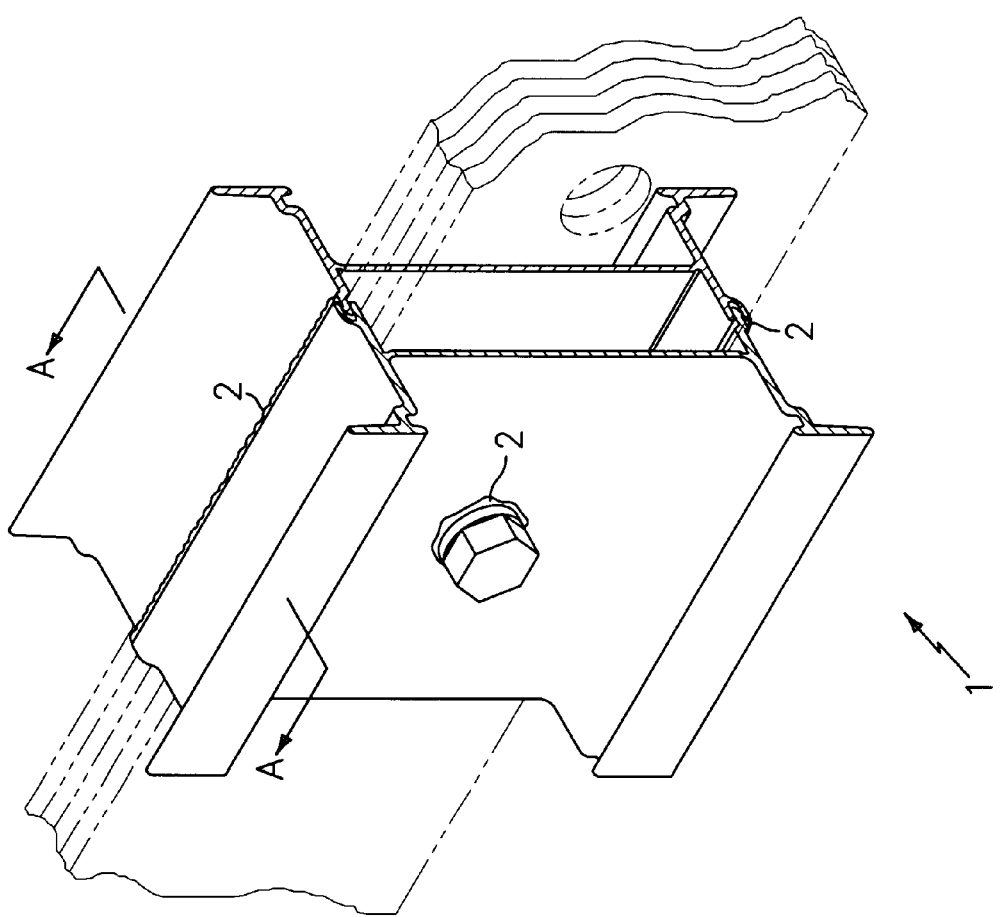
FIG. 2 is a cut-away top view of the busway housing of FIG. 1 showing the axial joints and surface gaps around the fastening bolt as sealed by the method of this invention.
Figure 3:
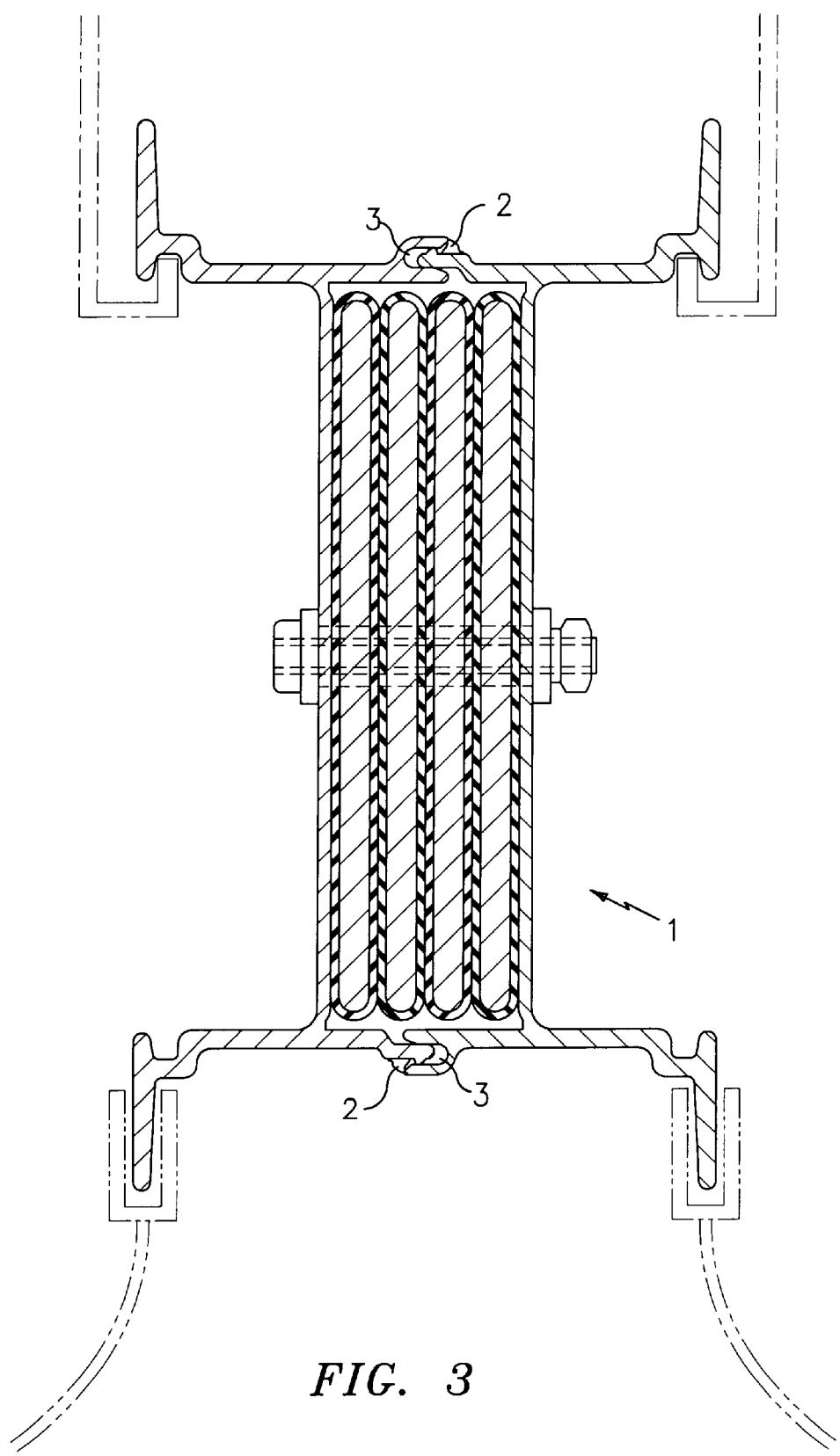
FIG. 3 is a cross-sectional view of FIG. 2, taken along the line A—A of the assembled busway system of FIG. 2.

This invention relates to a sealant material and the method of applying the sealant material to weatherproof busway systems. The sealant material provides, upon curing, a flexible seal suited for outdoor exposure to seal interlocking joint seams and joint flanges in busway housings or between two adjoining busway sections, as well as to encapsulate exposed bolt heads in busway systems. For such purpose, the sealant in this method in its uncured liquid state must be self-leveling, that is, it is flowable. As soon as it is injected into the joint surface, it flows down onto and against the surface of the joint as well as into minute gaps and openings under capillary action to form a water-tight seal. Otherwise, water can enter the busway system through the gaps and openings, including openings with width sizes fractions of an inch causing catastrophic failure problems. This flowability causes the sealant to form an intimate contact with the joint surfaces, allowing a maximum bond to form between the joint surfaces and the sealant. Furthermore, in its cured state, the sealant must be fast-figuring, that is, it has minimum sag to give a non-flow seal in a short period of time, preferably less than twenty minutes, so that workmen can turn the busway parts over and continue weatherproofing the busway system.

Additionally, for maximum efficiency as a busway sealant material, the cured sealant should have the following characteristics: 1) elongation over 100% to compensate for the movements or vibrations inherent with busway systems caused by external and magnetic forces or short-circuit stresses, and 2) meeting UML specifications for outdoor weathering such as UML 857 Rain test, UML 857 Section 43 Oxygen bomb test, UML 746C Section 26 Ultraviolet test, and UML 746C Section 27 Water Immersion test.

It is also important for the sealant to be long-lasting since busway systems generally have a fifty year life-expectancy—the sealant material should effectively seal for at least fifty years. To meet the long-term durability requirement, the sealant should have good adhesion to the busway system structure of painted steel, galvanized steel, or aluminum alloys. The sealant should be paintable as an integrated part of the busway system. The chosen sealant should also have a low modulus so that when the joint moves, the stress on the bond is low. It is also helpful for the sealant to be field-repairable so that the sealant can be applied to the busway systems in the field to repair any leaks in the joints.

The process to develop the above profile for the desirable sealant used to weatherproof busway systems includes a battery of tests and evaluations. Some of the evaluations are for the sealant materials. The materials themselves are tested to assure that they will ultimately form long-lasting seals that meet UML specifications, i.e., the sealants should be relatively unaffected by sunlight, rain, snow, ozone, ultraviolet radiation and temperature extremes. UML Ultraviolet Test (UML 746C Section 26) and UML Water Immersion Test (UML 746C section 27) are two typical examples of the types of tests performed on the sealant materials. Our tests include subjecting the sample sealant to hundreds of hours of "cycling" test. Each cycle is 20-minutes long, consisting of 17 minutes exposure to a xenon arc light source and 3 minutes exposure to a water spray with light. The sample material is then scrutinized for any sign of color changes, cracking, or swelling as a result of the various exposures. The sample material is also tested for any changes in tensile strength as well as elongation before and after UML exposure tests.

There are a number of other tests and criteria used to evaluate the sealant materials. For example, the sealants are tested to see if they are susceptible to oil, grease, and solvents. They are also tested to see if they form any hazardous materials under shortcircuit or burn-out conditions.

Besides the tests on the sample sealant materials, tests must be done for the selected sealants as factory and/or field-applied seals on the busway systems. A typical test is the UML Rain Test (UML 857 section 51). The rain test is designed to spray water on the busway system for eight hours a day for five consecutive days. In the preliminary test, red dye is placed on the surface of the busway system to test to see if there are any leaks and where the leaks occur. In another test, red dye is added to the water, and then the busway system is tested to see if there are leaks in the busway system. A modified Rain Test procedure includes adding fluorescent dye to the water in addition to the red coloring dye and using black light to accurately trace the path of water leaks in busway systems.

One type of sealant which has been found to be satisfactory is a one-component self-leveling silicone sealant which is preferably RTV (room temperature vulcanizing), free-flowing with viscosities at room temperature in the range of 25,000–350,000 cps. One such silicone sealant is a commercially available product sold under the name "CSL 509" by CSL Silicones, Guelph, Ontario. This one-part, moisture-curing RTV, self-leveling acetoxy silicone with a viscosity of about 110,000 cps, cures by exposure to moisture present in the air, starting immediately upon exposure and continuously for several hours, giving a non-flow seal in less than ten (10) minutes and being fully cured in about twenty-four (24) hours with maximum adhesion in seven (7) days. Another commercially available and suitable silicone sealant is available from Adhesive Engineering & Supply Inc., Seabrook, N.H. The product under the catalog number 10530 is also a moisture-curing RTV, self-leveling acetoxy silicone, with a viscosity of about 350,000 cps and a curing time of approximately twenty-four (24) hours. The self-leveling silicone compounds cure to a strong, silicone rubber that maintain long term durability and flexibility, particularly suitable as a seal in outdoor busway applications. The resultant seal exhibits excellent temperature and moisture resistant characteristics, as well as being resistant to a multitude of oils, greases, and solvents because the material is a cross-linked, thermoset sealant when fully cured. Additionally, the sealant retains its adhesion characteristics at normal temperature up to 450° F. and above, when it chars on the surface as it is exposed to heat and becomes hard.

Although silicone is a preferred sealant according to the present invention, it will be appreciated by the skilled artisan that many self-leveling sealants and adhesives would suffice. Other adhesives that are exemplary of the sealant of the present invention include many of the urethane sealants with special properties for UV resistance, high adhesion to metal surfaces and good weathering properties. One such urethane sealant is a reactive hot-melt, cross-linking polyurethane sealant commercially available from National Starch Company under the name of 70-7734. The material is solid at room temperature with the application temperature ranging from 225–250° F.

The preferred method of applying the preferred sealant, a silicone sealant, is by means of pumps and hoses to pump the flowable sealant from the storage container through the hose, and through an applicator gun to provide a consistent and uniform dispensing of sealant. The preferred method of applying a urethane sealant, such as one of the selected reactive hot melt polyurethanes, is to heat the polyurethane to a melting temperature before applying the sealant on the busway system by means of pressure pumps and hoses and through an applicator gun.

It should be understood that the method for sealing busways in the present invention is applicable to busway systems and designs other that depicted in FIGS. 1–5. The preferred method of this invention includes applying the self-leveling sealant axially along the length of the joint surfaces or interlocking surfaces or flanges of the busway housing as in FIGS. 1–3, wherein 1 is the busway system, 2 is the sealant. The sealant can also be applied to the surface gaps around fasteners as seen in the figures, wherein sealant is applied around the raised/exposed bolt heads in the busway housing. Due to the self-leveling nature of the sealant material, some of the material may flow to fill-in the crack 3 in the interlocking surfaces of the busway housing as in FIG. 3.

Figure 4:
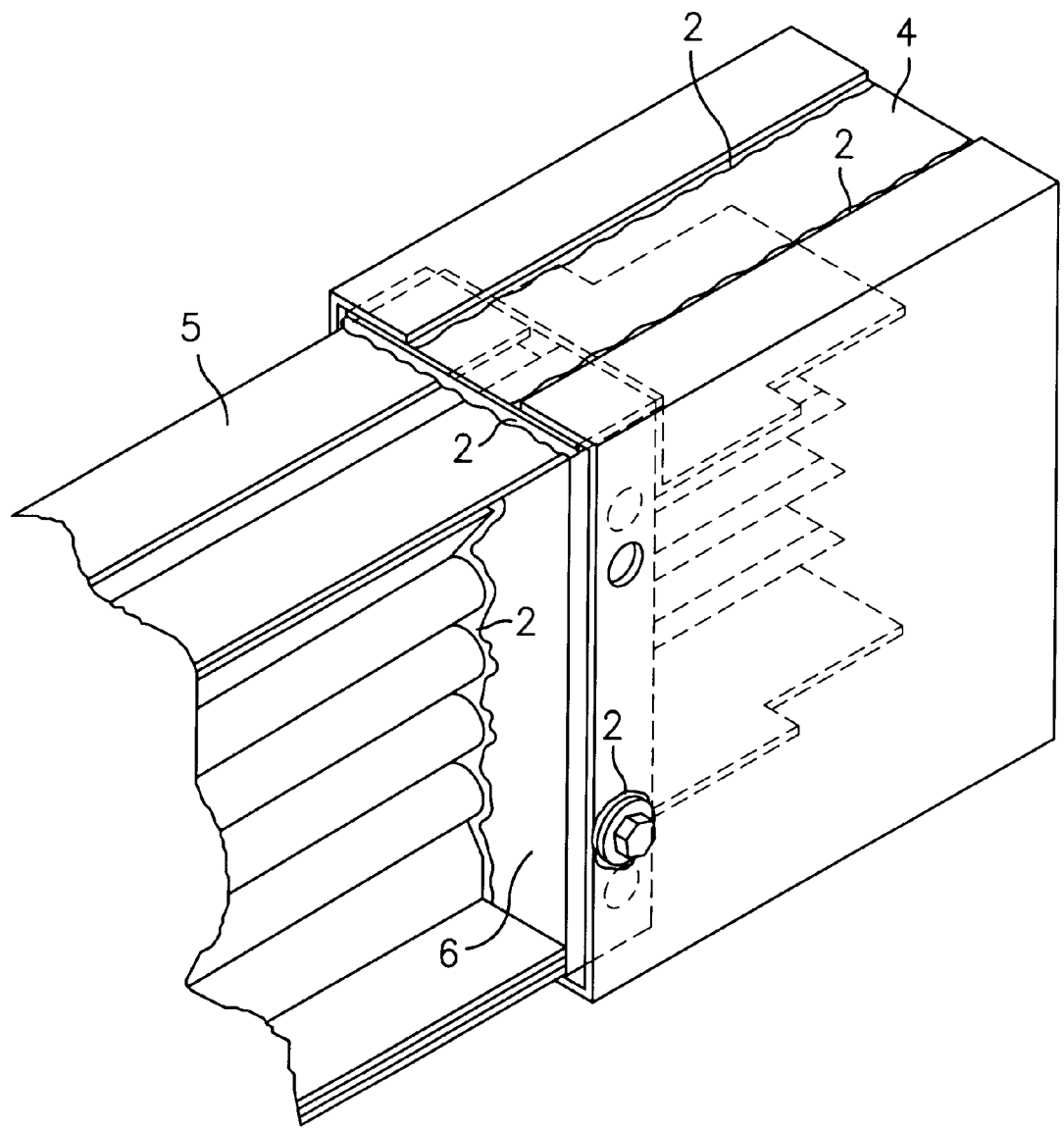
FIG. 4 is a top perspective view of a joint connecting the end of a busway section to adjoining busway sections, wherein the gaps and surfaces in the joint cover as well as between the busway housing and the joint brace are weatherproofed utilizing the instant invention.
Figure 5:
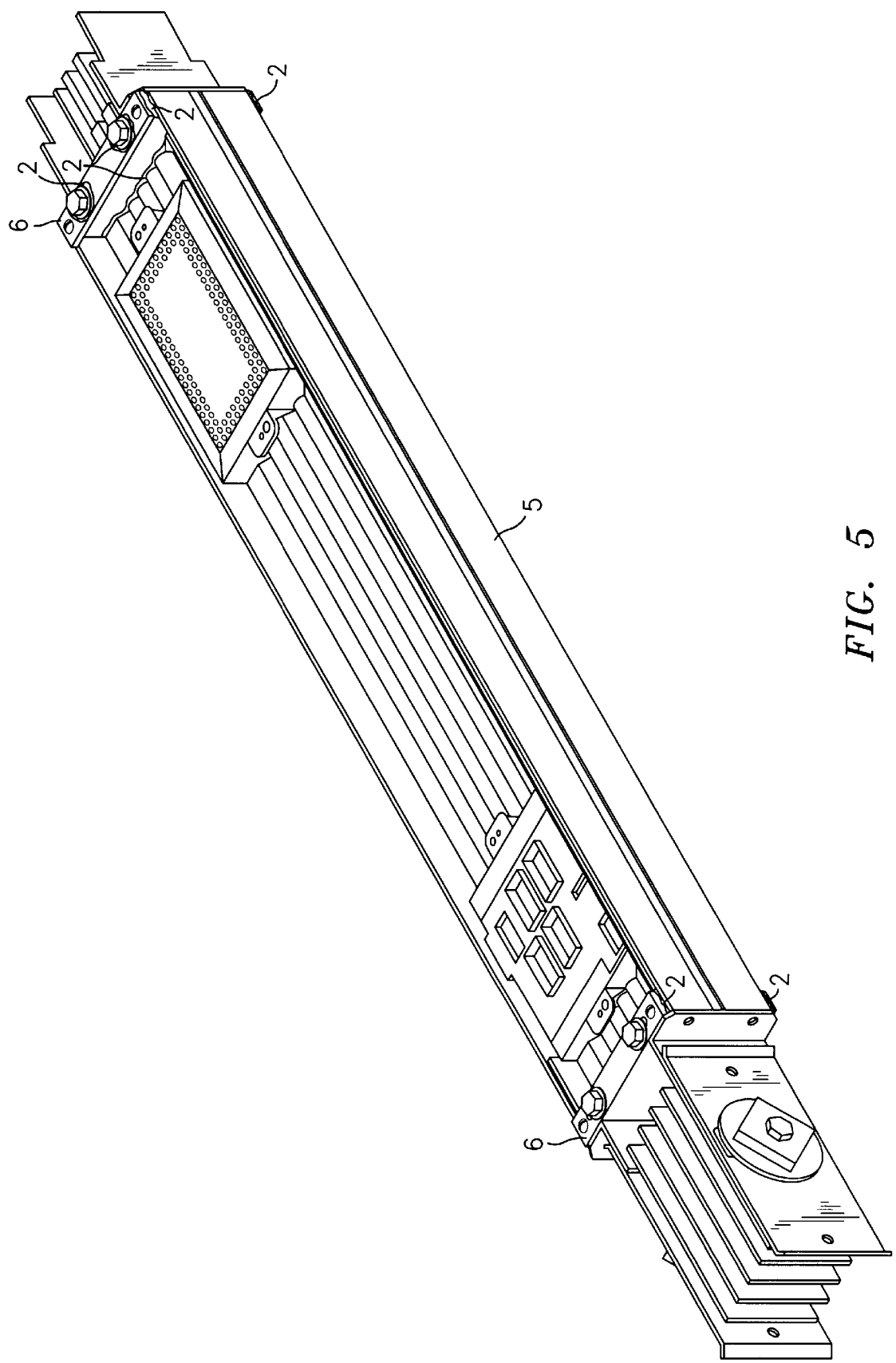
FIG. 5 is an isometric view of a busway system, wherein the joints and surface gaps in the busway housing are weatherproofed by the method of this invention.

In FIG. 4, the sealant 2 is applied around the flat joint cover 4 of a busway joint connecting two adjacent busway sections (only one busway section is shown in the Figure) as well as between the busway housing assembly 5 and the housing brace 6. FIG. 5 is an isometric view of a busway system showing the busway section and two busway housing braces 6 at ends of the section. In this Figure, the sealant is applied to the joints between the busway housing assembly and the housing braces 6 as well as around the surface gaps of the fasteners.

The self-leveling sealant is preferably applied to joints and surface gaps using an applicator gun supported on an application machine, which may be computer-controlled as in a pressure dispensing setup. After the sealant is injected out of the applicator gun of the dispensing system, it flows down to fill the gap in the joints or around the fastener head because of the self-leveling characteristic (flowable under the force of gravity). This flowability causes the sealant to form an intimate contact with the joint surfaces, allowing a maximum bond to form between the sealant and the busway metal surfaces.

The sealant should be applied to cover the entire length of the joints or fully around the exposed fastener heads without any gap in the seal. The application gun should be adjusted so that the applicator accurately directs the sealant to the interface between the joint metal surfaces. The sealant is preferably applied at such a rate that it is allowed to form a tight seal bonding the opposing surfaces of a busway joint. Silicone sealants should be applied at a relatively slow forward velocity to allow the materials to flow out gradually filling gaps and cracks, and assuring a good bond between the sealant and the metal surfaces. It is important that urethane sealants be applied to the surfaces of a busway joint at a temperature where the sealants remain in a hot tacky and viscous state for a few minutes. This will allow the sealants time to flow into gaps and cracks in the busway system to bond the surfaces while the sealants are still in the molten state. Rapid curing and less-than-optimum joints have been observed when urethane sealants are not applied at an optimum temperature. In these tests, urethane sealants were applied to joints in assemblies of large-sized aluminum busway blocks. The aluminum blocks acted as a heat sink, giving the urethane sealants very little time to flow to the gaps in between and bond to the surfaces of the metal before the urethane materials cured to a solid state.

One applicator gun that can be used in the method of this invention for the preferred silicone sealants is a commercially available dispensing gun from Graco or Binks for a simple drum plate follower system with a gear pump. The equipment for the urethane sealants is commercially available from Nordson® of Armherst, Ohio, with a model 506 having a standard diameter nozzle gun. Another suitable application system for the urethane sealants is a Therm-O-FLow® 55 dispensing system, which is commercially available from Pyles Division of Sealed Power Corporation of Wixom, Mich.

As will be understood by those skilled in the art, various modifications may be made to the method of applying a self-leveling sealant to weatherproof busway systems. For example, a hand-held application gun can be used to apply the self-leveling sealant to seal the busway joints or gaps instead of a pressure dispensing gun. Additionally, the sealant can be injected into the joint space to a certain depth, instead of simply being applied on the joint gap to fill the gap.

What is claimed is:

1. A method for sealing joints, gaps, and surfaces in an electrical busway distribution system, said method comprising:

selecting a self-leveling sealant;

applying the self-leveling sealant directly to joints, gaps, or surfaces of said busway system;

said sealant subsequently flowing into said joints, gaps or across said surfaces solely under a gravitational influence so that said joints, gaps, or surfaces are sufficiently filled by the sealant; and allowing the sealant to cure to form a continuous seal between said joints, gaps, or surfaces.

2. The method of claim 1, wherein selecting said the self-leveling sealant includes selecting a fast-figuring self-leveling sealant to give a non-flow seal in less than twenty minutes.

3. The method of claim 2, wherein said selecting the self-leveling sealant includes selecting a silicone sealant.

4. The method of claim 3, wherein said selecting said self-leveling sealant includes selecting a sealant with a viscosity between 25,000 and 350,000 cps. at room temperature.

5. The method of claim 4 wherein said selecting said self-leveling sealant includes selecting a sealant with a viscosity between 110,000 and 350,000 cps. at room temperature.

6. The method of claim 2, wherein said selecting the self-leveling sealant includes selecting a hotmelt cross-linking polyurethane.

7. The method of claim 2, wherein said said selecting the self-leveling sealant includes selecting a reactive hotmelt, cross-linking polyurethane.

8. An electrical busway distribution system comprising joints, gaps, and surfaces sealed by the method of claim 1.

9. The method of claim 3, wherein said selecting said silicone sealant includes selecting a one part, moisture-curing room temperature vulcanizing sealant having a non-flow seal in less than ten minutes and being fully cured in essentially twenty-four hours with maximum adhesion in seven days.

10. The method of claim 6, wherein said applying the self-leveling sealant includes applying said hot melt cross-linking polyurethane at an optimum temperature so that said sealant remains in a molten state for at least ten minutes.

11. A method for sealing joints, gaps, and surfaces in an electrical busway distribution system, said method comprising:

selecting a self-leveling sealant with a life expectancy of at least 50 years and which can withstand elongation of over 100% without failure:

applying the self-leveling sealant directly to joints, gaps, or surfaces of said busway system;

said sealant subsequently flowing into said joints, gaps or across said surfaces solely under a gravitational influence so that said joints, gaps, or surfaces are sufficiently filled by the sealant; and allowing the sealant to cure to form a continuous seal between said joints, gaps, or surfaces.

* * * * *